April 8, 1969 — R. S. MUELLER — 3,437,167
VEHICLE SPEED CONTROL MECHANISM
Filed Jan. 3, 1967 — Sheet 1 of 3

INVENTOR.
ROBERT S. MUELLER
BY Yount, Raney, Flynn, & Tarolli
ATTORNEYS

INVENTOR.
ROBERT S. MUELLER
ATTORNEYS

INVENTOR.
ROBERT S. MUELLER

ATTORNEYS

United States Patent Office 3,437,167
Patented Apr. 8, 1969

3,437,167
VEHICLE SPEED CONTROL MECHANISM
Robert S. Mueller, Southfield, Mich., assignor to Eaton Yale & Towne Inc., Cleveland, Ohio, a corporation of Ohio
Filed Jan. 3, 1967, Ser. No. 606,755
Int. Cl. B60k 31/00
U.S. Cl. 180—105     12 Claims

ABSTRACT OF THE DISCLOSURE

A vacuum operated speed governor unit when energized maintains the speed of the vehicle at a desired value and an inertia switch mechanism is operable in response to inertia or centrifugal forces acting thereon when the vehicle is negotiating a curve, linearly decelerating or going over a series of bumps in the road surface to render the speed governor unit ineffective to control the vehicle speed when such operating conditions are encountered.

The present invention relates to a control mechanism, and more particularly to a control mechanism for controlling the speed of a vehicle and which includes a speed governor unit operable to control the position of an engine throttle member to maintain the speed of the vehicle at a desired value and a condition responsive means operable to render the speed governor unit ineffective to control the speed of the vehicle when certain conditions during operation of the vehicle are encountered.

Heretofore, mechanisms for controlling the speed of a vehicle have included a speed governor unit which is operable to maintain the speed of the vehicle at a desired value. In known mechanisms of this type, the speed governor unit is manually actuated and is automatically de-actuated when the brake pedal is depressed to reduce the speed of the vehicle. While the desirability of such speed control mechanisms is well recognized, they have not been entirely satisfactory in that the speed governor unit is not automatically rendered ineffective to control the speed of the vehicle upon encountering certain conditions during operation of the vehicle, which for safety reasons would be highly desirable. For example, when the vehicle is negotiating a curve at too high a rate of speed, it is necessary in these known control mechanisms to depress the brake pedal in order to render the speed governor unit ineffective to control the speed of the vehicle so that the curve can be negotiated safely. Likewise, when an abrupt linear deceleration or a series of bumps in the road surface is encountered, the speed governor unit of these known control mechanisms is not automatically rendered inoperative unless the brake pedal is depressed.

Accordingly, an important object of the present invention is to provide a new and improved mechanism for controlling the speed of an automotive vehicle and which includes a speed governor unit operable to maintain the speed of the vehicle at a desired value and an inertia or centrifugal force responsive means operable to render the speed governor unit ineffective to control the speed of the vehicle when subjected to a predetermined centrifugal force while the vehicle is negotiating a curve.

Another object of the present invention is to provide a new and improved mechanism for controlling the speed of the vehicle, as defined in the next preceding object, and wherein the inertia or centrifugal force responsive means is also operable to render the speed governor unit ineffective to control the speed of the vehicle when subjected to predetermined inertia forces when the vehicle is linearly decelerating or when a series of bumps in the road surface are encountered.

Yet another object of the present invention is to provide a new and improved control mechanism of the character referred to above for controlling the speed of the vehicle, and wherein the speed governor unit is a vacuum operated speed governor unit having an actuating member operatively connected with the engine throttle member and which is movable to move the throttle member in a throttle opening direction when a vacuum is created in a vacuum chamber located on one side of the actuating member, and wherein the inertia or centrifugal force responsive means is operable to substantially reduce the vacuum in the vacuum chamber of the speed governor unit to render the same ineffective to control the speed of the vehicle.

A further object of the present invention is to provide a new and improved mechanism of the character referred to above for controlling the speed of the vehicle, and in which the inertia or centrifugal force responsive means includes a support member fixed to the vehicle and movable therewith, a movable member movable relative to the fixed support member when subjected to a predetermined inertia or centrifugal force and means responsive to movement of the movable member relative to the fixed support member for rendering the speed governor unit ineffective to control the speed of the vehicle.

A still further object of the present invention is to provide a new and improved mechanism for controlling the operation of an electrically operated control or device on an automotive vehicle, and which includes a first member fixed to the vehicle for movement therewith, a second member carried by the first member and movable relative thereto in response to inertia forces of a predetermined value acting thereon, and an electrical switch means operatively associated with the members and which is actuatable to control actuation of the electrically operated device in response to movement of the movable member relative to the fixed member.

Yet another object of the present invention is to provide a new and improved mechanism for actuating a control, and which includes a housing member and a snap-acting over-center spring having a pair of contacts carried by the housing member, and in which a member carried by the housing member is movable relative thereto in response to inertia forces of a predetermined value acting thereon, and wherein the over-center snap-acting switch is actuated between open and closed positions in response to movement of the inertia member relative to the housing.

The present invention also resides in certain novel constructions, combinations, and arrangement of parts and further objects and advantages thereof will be apparent to those skilled in the art to which the invention relates and from the following detailed description of the illustrated embodiment thereof described with reference to the accompanying drawings forming a part of the present specification and in which.

The present invention provides a novel control mechanism particularly useful in controlling the operation of a speed governor unit to control vehicle speed, and for the purposes of illustration the mechanism is herein shown and described as being used for that purpose.

Figure 1:
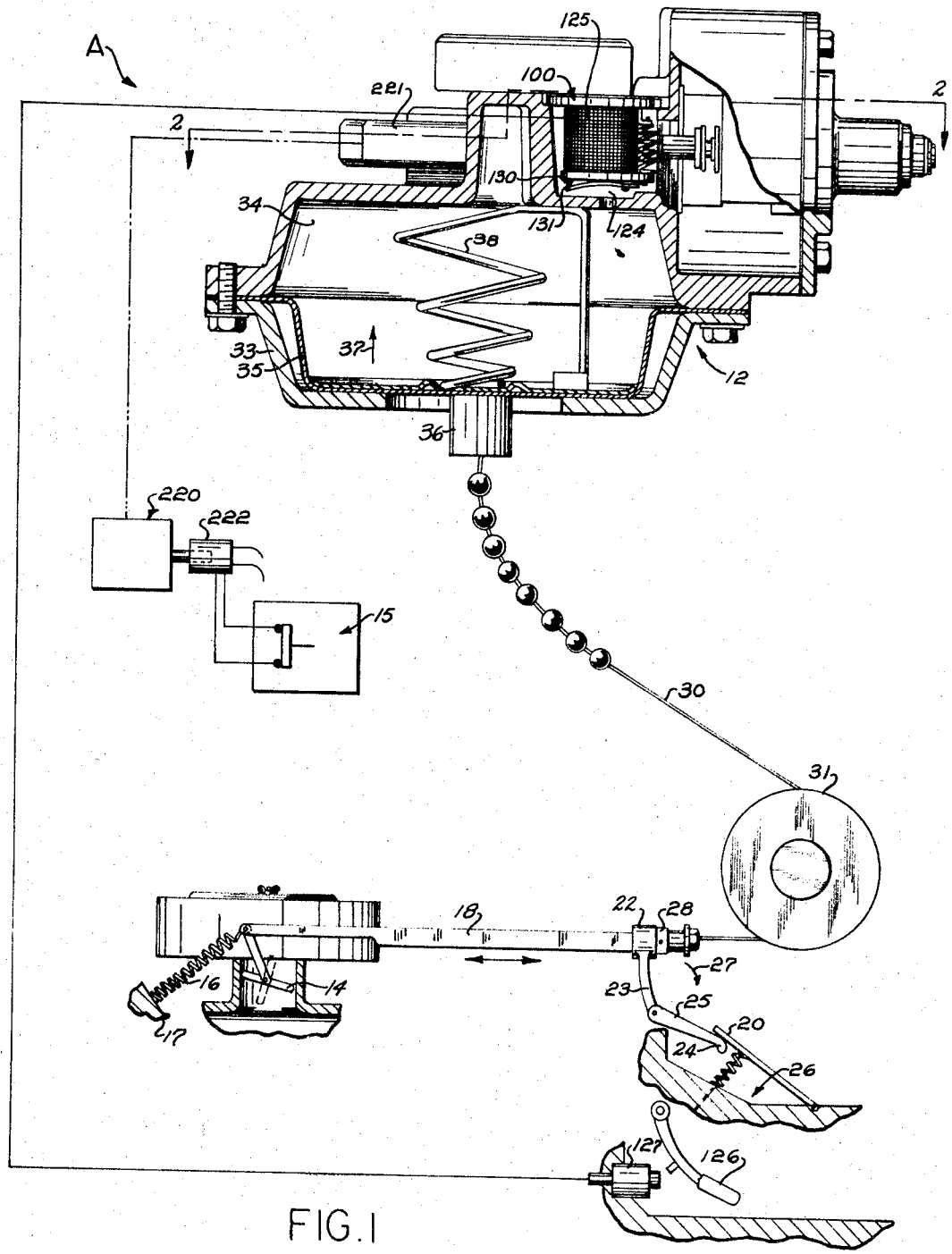
FIG. 1 is a schematic view illustrating one embodiment of a mechanism for controlling the speed of a vehicle.

Referring to FIG. 1 of the drawings, a speed control mechanism A for controlling the speed of an automotive vehicle is there schematically shown. The speed control mechanism A comprises, in general, a speed governor unit 12 operable to control the position of an engine throttle member 14 of an automotive vehicle to control the speed of the vehicle, and a condition responsive means 15 which is operable to render the speed governor unit 12 ineffective to control the speed of the vehicle when certain operating conditions of the vehicle are encountered, as will be described hereinbelow in detail.

The engine throttle member 14 is movable from a closed position, as shown by the solid lines of FIG. 1, toward a fully open position, as shown by the dotted lines of FIG. 1, in a throttle opening direction for increasing the vehicle speed and is moved in the reverse direction toward its closed position for decreasing the vehicle speed. The throttle member 14 is biased to its closed position by a spring 16, one end of which engages a suitable fixed support member 17 and the other end of which engages one end of a rod 18 which is connected to the throttle member 14. The rod 18 is connected to the throttle member 14 so as to effect movement of the throttle member 14 between its positions upon linear movement of the rod 18. As viewed in FIG. 1, when the rod 18 moves toward the right, the throttle member 14 moves in its throttle opening direction and when the rod member 18 moves toward the left, the throttle member 14 moves in a throttle closing direction.

The rod 18, as noted above, is biased by the spring 16 toward the left and is moved toward the right upon depression of an accelerator pedal 20 of the automotive vehicle. To this end, the rod 18 slidably connected to one end 22 of a bell-crank lever 23 which in turn is pivotally connected intermediate its ends to a fixed support on the automotive vehicle. The other end 24 of the bell-crank lever 23 is disposed beneath the upper end of the accelerator pedal 20, as viewed in FIG. 1. When the accelerator pedal 20 is depressed, i.e., moved in the direction of the arrow 26, it engages the end 24 of the bell-crank lever and cause the same to be pivoted in the direction of the arrow 27. Movement of the bell-crank lever 23 in this direction causes the upper end 22 thereof to engage an abutment 28 fixed to the rod 18 to cause the rod 18 to be moved toward the right and the throttle member 14 to be moved in a throttle opening direction.

The throttle member 14 may also be moved in its throttle opening direction by means of the speed governor unit 12 which is operatively connected with the rod 18, such as by means of a flexible chain-like member 30 trained around a pulley 31 as shown in FIG. 1. The speed governor unit 12 is a vacuum operated control unit, and is preferably of the type disclosed in either application Ser. No. 453,750, filed Mar. 6, 1965, now Patent No. 3,324,978 or application Ser. No. 569,985, filed Aug. 3, 1966, both of which are assigned to the same assignee as the present invention. Since the speed governor unit 12 does not per se form a part of the present invention, it will not be described in complete detail, but will only be described to the extent necessary for one skilled in the art to understand its general operation and its operational relationship with the speed control mechanism A.

The speed governor unit 12 includes a housing 33 which defines in part a vacuum chamber 34, and supports a flexible diaphragm 35 which forms a wall of the vacuum chamber 34. The diaphragm 35 is connected by means of a suitable clip 36 to the end of the chain-like member 30 opposite its end which is connected to the rod 18. Movement of the flexible diaphragm 35 in the direction of the arrow 37, shown in FIG. 1, is in the direction to effect movement of the rod 18 toward the right, as viewed in FIG. 1, through the chain-like connection 31 and movement of the throttle member 14 in a throttle opening direction.

The diaphragm 35 is moved in the direction of the arrow 37 in response to the creation of a vacuum in the vacuum chamber 34 and is biased in the opposite direction toward the position shown in FIG. 1 by means of a suitable spring 38 and the spring 16. When the vacuum in the chamber 34 and the forces applied by the springs 38 and 16 balance, the diaphragm 35 stops moving and is in an equilibrium condition. If the vacuum is then either increased or decreased, the diaphragm 35 will move. As will hereinafter become more fully apparent, if the vehicle speed decreases, as when the vehicle goes up a hill, the vacuum will increase to move the diaphragm in the direction of the arrow 37 to increase the throttle opening. If the vehicle speed increases, as when the vehicle goes down a hill, the vacuum will decrease and the springs 38, 16 will move the diaphragm in the opposite direction and the spring 16 will decrease the throttle opening.

The vacuum in the vacuum chamber 34 is provided through a suitable vacuum connection 40 (see FIG. 2) in the hosing 33 which is connected by a suitable conduit, not shown, to the intake manifold of the vehicle to apply a vacuum thereat. The vacuum chamber 34 also communicates with the atmosphere through a suitable connection 41 in the housing 33. The connection 41 is spaced slightly from the vacuum connection 40 and located opposite thereto.

The vacuum in the vacuum chamber 34 is controlled by a flapper valve or a flapper member 42, which, in general, controls the amount of communication between the vacuum connection 40 and the atmospheric connection 41 and the vacuum chamber 34. The flapper valve 42 is an elongated member which extends between nozzle like opening 43, 44 connecting the vacuum and atmospheric connections 40, 41 with the vacuum chamber 34. The flapper valve 42 is movable relative to the nozzle openings 43, 44 and when positioned adjacent to the nozzle opening 43 it substantially blocks communication between the vacuum conduit 40 and the vacuum chamber 34, and the chamber 34 thus is at substantially atmospheric pressure and the diaphragm member 35 is in the position shown in FIG. 1. When the flapper valve 42 moves away from the nozzle 43, the vacuum connection 40 is placed in communication with the vacuum chamber 34 and a vacuum is established therein causing the diaphragm member 35 to move in its throttle opening direction (in the direction of the arrow 37 of FIG. 1) to effect opening movement of the throttle member 14. The flapper valve 42 specifically is a flat strip member which extends between the adjacent nozzles 43 and 44, respectively, and is biased by a suitable leaf spring 45 into engagement with the nozzle 43, thereby blocking communication between the vacuum connection 40 and the vacuum chamber 34.

Figure 2:
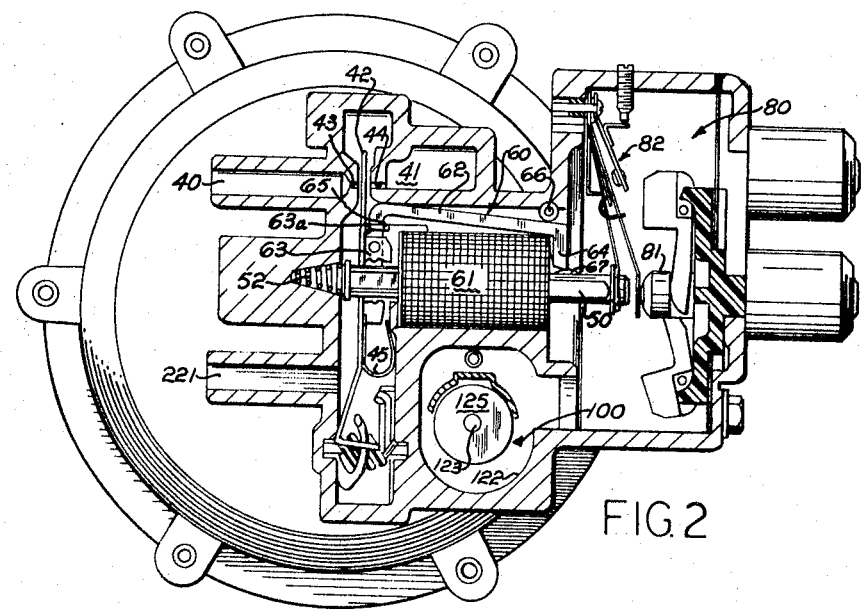
FIG. 2 is an enlarged sectional view of part of the mechanism shown in FIG. 1 and taken approximately along line 2—2 of FIG. 1.

The flapper valve 42 is moved toward the right and left, as viewed in FIG. 2, when the speed governor unit 12 is actuated in response to a decrease and an increase in the vehicle speed from the desired speed, respectively. When the flapper valve 42 is moved toward the right, an increased vacuum is created in the vacuum chamber 34, the increase being in accordance with the amount of movement of the flapper valve 42. This causes movement of the diaphragm 35 in its throttle opening direction, as indicated by direction of the arrow 37 in FIG. 1, to hold the vehicle speed near the desired speed. When the flapper valve 42 is moved toward the left, a decrease in the vacuum in the vacuum chamber 34 is effected, since an increase in the communication between the vacuum chamber 34 and the atmospheric connection 41 is effected. This causes the springs 38 and 16 to move the diaphragm in a throttle closing direction (in the direction opposite to the direction of the arrow 37 in FIG. 1) to hold the vehicle near the desired speed.

Movement of the flapper valve 42 toward the right and left, as viewed in FIG. 2, is effected in response to movement of a core member 50, which moves right and left, in response to changes in vehicle speed. The core member 50 moves toward the left upon an increase in the vehicle speed and moves toward the right upon a decrease in vehicle speed, and in a manner to be hereinafter more fully described. The left end of the core member 50, as viewed in FIG. 2, is slidably received through an opening in the flapper valve 42. A suitable spring member 52 is supported in the housing 33 and engages the left end of the core member 50 and biases the core member 50 toward the right.

The speed governor unit 12 includes a locking mechanism 60 for locking the core member 50 to the flapper valve 42 to cause these members to move toegther so that as the core member 50 moves in response to vehicle speed, the flapper valve 42 likewise moves. The locking mechanism 60 includes an electric coil 61 which is positioned so as to encircle the core member 50 and a locking bracket or link 62 which straddles the coil member 61 end-to-end and which is engageable with the core member 50 at the opposite ends of the coil 61. The bracket or link member 62 is U-shaped and the legs 63 and 64 of the bracket are positioned at the opposide ends of the coil 61 and the extreme ends of the legs 63 and 64 engage the core member 50 when the coil 61 is energized.

The leg 63 of the link 62 intermediate its ends is pivotally supported by a cross pin 63a carried by the flapper valve 42. A flexible and resilient connection in the form of a bifurcated spring wire member 65 couples the leg 63 of the link member 62 resiliently to the flapper valve 42. The spring wire 65 functions to bias the link member 62 counterclockwise, as viewed in FIG. 2 against an adjustable and eccentric stop 66.

In order to lock the core member 50 to the flapper valve 42, the coil 61 is energized causing movement of the link 62 by magnetic attraction in a clockwise direction, as viewed in FIG. 2, from the position shown in FIG. 2. Because of the construction and arrangement of the flapper valve 42, core 50, and the link 62, when the coil 61 is energized, the lower end of the leg 63 of the link 62 first locks to the core member 50 and becomes a temporary fulcrum for the link 62, and the flapper valve 42 and the link pivot as a unit. The flapper valve 42 due to the pivoting movement moves from contact with a nozzle 43, and, as will be described in detail hereinbelow, moves to a position located a distance from the nozzle 43 to have the appropriate vacuum applied to the chamber to hold the throttle member to maintain the desired speed. The link 62 then pivots about the pivot pin 63a carried by the flapper valve 42, with its opposite leg 64 moving down toward the core 50 to lock the latter to the flapper valve 42. From the foregoing, it should be apparent that the core member 50 and the flapper valve 42 are locked together upon energization of the coil 61.

When the coil 61 is deenergized, the spring wire 65 tends to return the link 62 to the position illustrated in FIG. 2. A suitable leaf spring 67 carried by the core and engageable with the lower end of the leg 64 of the link 62 can be provided to assist and move the link 62 from the locking position back to the position shown in FIG. 2. The spring 67, however, does not interfere with the locking of the link 52 to the core 50.

As already pointed out, the vacuum in the vacuum chamber 34 is controlled, when the electrical coil 61 is energized, by movement of the flapper valve 42 relative to the vacuum nozzle 43 upon movement of the core member 50. The core member 50 is moved in response to increases and decreases in the speed of the vehicle by means of a vehicle speed sensing means or mechanism, generally designated by reference numeral 80. The speed sensing mechanism 80 can be of any suitable or conventional construction, but is preferably of the type disclosed in the aforementioned pending U.S. application Ser. No. 569,985. Since the speed sensing mechanism does not per se form a part of the present invention, it will not be described in detail. Suffice it to say the speed sensing mechanism 80 is operatively connected with the vehicle drive and includes a movable abutment 81 which is located directly opposite the right end of the core 50, as viewed in FIG. 2, and which is movable toward the left and right in response to an increase and a decrease in the speed of the vehicle, respectively. Suffice it further to say that the movable abutment 81 engages the right end of the core member 50 to effect movement of the core member 50 toward the left in response to an increase in the speed of the vehicle, and that the compression spring 52 effects movement of the core 50 toward the right when the abutment moves toward the right in response to a decrease in the vehicle speed.

The governor unit 12 preferably also includes an over center snap acting switch means 82 positioned between the right end of the core member 50, as viewed in FIG. 2, and the movable abutment 81 of the speed sensing mechanism 80 to provide a low speed cutout switch to render the speed governor unit 12 inoperative to control the speed of the vehicle when the speed thereof is below a predetermined minimum speed. The construction of the over center snap-acting switch and its manner of operation are the same as that disclosed in the aforementioned U.S. patent application Ser. No. 569,985, and since it does not per se form a part of the present invention, it will not be described in detail. Suffice it to say that the switch 82 has a pair of contacts which are relatively movable by the movable abutment 81 between open and closed positions when the speed of the vehicle is below and above a predetermined minimum speed.

The speed governor unit 12 also includes a solenoid actuated vacuum release valve means 100 (see FIG. 1) to render the speed governor unit 12 operable or inoperable to control the vehicle speed. The vacuum release valve can be of any suitable or conventional construction, but is preferably of the type disclosed in the aforementioned U.S. patent application Ser. No. 569,985. Since the release valve per se does not form a part of the present invention, it will only be described to the extent necessary for one skilled in the art to understand its operation and its operational relationship with the speed control mechanism A.

The release valve means 100 is mounted in a recess 122 in the speed governor housing 33, the recess being in communication with the vacuum chamber 34 via an opening 123 (see FIG. 1). The vacuum release valve comprise a suitable valve member 124 which is spring biased to an open position in which it unblocks the opening 123 to communicate the vacuum chamber 34 to the atmosphere. The valve member is movable from its open position in opposition to the biasing force of the spring to a closed position in which it blocks the opening to block communication between the vacuum chamber 34 and the atmosphere by energizing a solenoid coil 125. The solenoid coil 125 of the vacuum release valve 100 is energized to hold the valve in its closed position when the speed governor is actuated to control the speed of the vehicle and is denergized to allow the valve to be moved to its open position and vent the vacuum chamber 34 to the atmosphere.

The coil 125 is adapted to be deenergized to vent the vacuum chamber to the atmosphere upon depression of the brake pedal 126 to reduce the speed of the vehicle.

To this end, a suitable switch 127 is provided on the floorboard of the vehicle and which is engaged by the brake pedal 125 upon being depressed for controlling energization and deenergization of the solenoid 125. The switch 127 is actuated from a normally closed position to an open position in response to depression of the brake pedal 126. When the brake pedal 126 is depressed, the switch 127 is moved to an open position to deenerize the solenoid 125 of the release valve means 100 to cause the vacuum chamber to be immediately vented to the atmosphere so as to render the speed governor unit inoperative or ineffective to control the speed of the vehicle during braking. The valve means 100 also includes a pair of switch contacts 130, 131 which are relatively movable between closed and open positions in response to movement of the valve member 124 between closed and open positions, respectively, and for reasons which will hereinafter become more fully apparent.

A previously mentioned, the speed control mechanism A includes a condition responsive means for rendering the speed governor unit ineffective or inoperable to control the vehicle speed when certain operating conditions are encountered during operation of the vehicle. The condition responsive means 15 is in the form of an inertia switch means or mechanism which, in general, is operable when an insertia or centrifugal force in excess of a predetermined value is acting thereon when the vehicle is negotiating a curve to render the speed governor unit ineffective to control the vehicle speed while negotiating the curve. The inertia switch mechanism is also operable when an inertia force in excess of a predetermined value is acting thereon due to the vehicle being abruptly linearly decelerated or when the vehicle is subjected to vibrations as a result of going over a series of bumps in the road surface.

Figure 3:
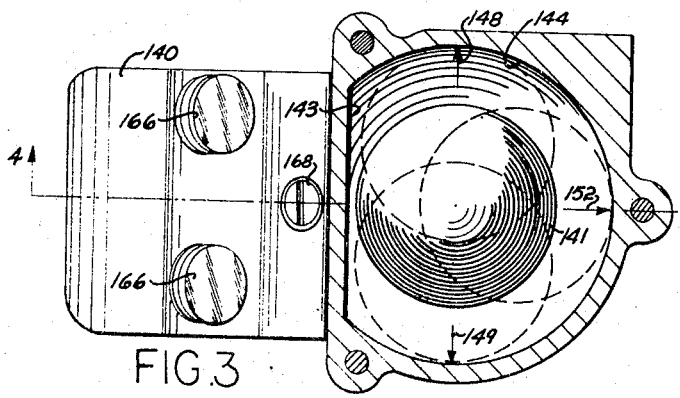
FIG. 3 is a top plan view with parts thereof shown in section of the preferred embodiment of an inertia switch mechanism comprising part of the speed control mechanism shown in FIG. 1.
Figure 4:
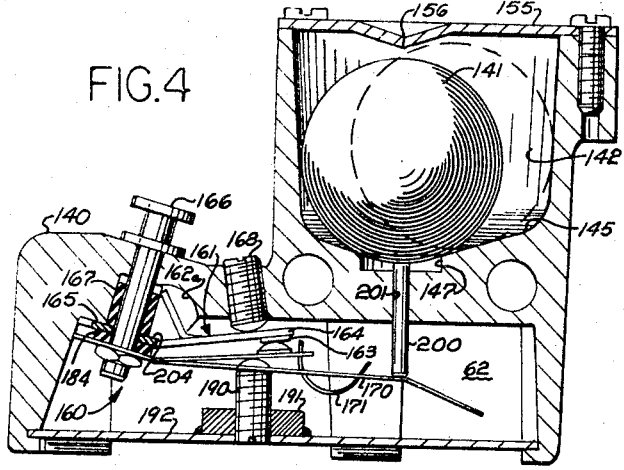
FIG. 4 is a vertical cross-sectional view taken approximately along line 4—4 of FIG. 3.

The inertia switch means or mechanism 15, in the preferred embodiment, comprises a housing 140 which is suitably fixed to the vehicle and movable therewith and a spherical ball 141 supported by the housing and which is movable relative thereto in response to inertia forces acting thereon. As best shown in FIGS. 3 and 4, the housing 140 has a vertically extending recess or opening 142 at its upper end which defines a socket in which the ball 141 is received. The recess 142 is defined by a continuous, vertically extending inner side wall surface having a planar portion 143 at the left or rearward end, as viewed in FIG. 3, and an arcuate portion 144, and a sloping bottom surface 145. The bottom 145 is provided with a seat 147 upon which the ball 141 is normally positioned and the sloping or tapered bottom tapers in a downwardly direction, as viewed in FIG. 4, from the side wall surfaces 143, 144 toward the seat 147 so as to provide an inclined surface up which the ball must roll when subjected to inertia forces. The seat 147 is located in the bottom 145 such that the ball 141, when positioned thereon, is located closely adjacent the rear side wall surface 143.

The ball 141 has a diameter which is less than the transverse dimension of the opening 142 and is movable from the seat 147 up the inclined bottom surface 145 toward the arcuate side wall portion 144 of the recess 142 when subjected to inertia forces exceeding a predetermined value. As best shown in FIG. 3, the side wall portion 144 is concentric with the seat 147 and has a circumferential extent of 270 degrees with respect to the center of the seat 147. The construction of the socket 142 is such that the ball is free to move outwardly from its seat in any one of 270 degrees or fraction thereof.

When the vehicle is negotiating a curve the inertia or centrifugal force acting on the ball 141 will tend to move the ball 141 in either the direction of the arrow 148 or 149, depending upon whether the curve is a leftward or rightward curve. Due to the inclined sloping bottom 145, it is necessary that the inertia or centrifugal force acting on the ball exceed a predetermined desired value before the ball will move outwardly toward the side wall portion 144. The predetermined force necessary to cause the ball 141 to move off its seat 147 can be varied by varying the taper angle of the bottom 145 of the socket 142 with respect to the horizontal. The taper angle for the bottom 145 is preferably about 18–19 degrees and such that the ball 141 will move off its seat 147 upon a centrifugal force acting on the ball and vehicle which is far less than the maximum centrifugal force for safely negotiating a curve.

Likewise, when the vehicle is linearly decelerating, such as upon braking or crashing into an object or other vehicle, the inertia force acting on the ball 141, when in excess of the predetermined value, will cause the ball 141 to move from its seat 147 forwardly, i.e., in the direction of the arrow 152 as shown in FIG. 3, up the inclined bottom surface 145 toward the side wall portion 144. Also, when a series of bumps are encountered in the road surface the inertia forces acting on the ball 141, when in excess of the predetermined value, due to the vibrations set up when encountering the bumps will cause the ball 141 to move off its seat 147 toward the side wall portion 144. To prevent the ball 141 from being moved upwardly off its seat 147 when the vehicle engages a single bump, a suitable top plate or cover 155 having a dip portion 156 for the socket 142 is provided. The cover 155 is suitably secured to the housing 140 and extends across the opening 142 at its upper end, with the dip portion 156 being located closely adjacent the top of the ball 141 when the latter is on its seat 147 to prevent vertical displacement of the ball 141 when the vehicle engages a single bump in the road surface.

The inertia switch mechanism 15 further includes a means 160 operatively connected with the speed governor unit 12 and which is responsive to movement of the ball 141 off its seat 147 for rendering the speed governor unit 12 ineffective to control the speed of the vehicle. The means 160 comprises an over center snap-acting switch 161 located within a downwardly facing recess 162 in the housing 140 and which is positioned so as to be operated by the ball 141 when it moves off and onto its seat. As best shown in FIG. 4, the switch 161 includes a fixed contact 163 carried at the right end of a relatively stiff, generally horizontally extending arm 164. The arm 164 at its left end is formed integral with a cross piece 165 having a pair of openings for receiving a pair of mounting pins or studs 166 for mounting this end on the bottom wall 162a of the recess 162. As shown in FIG. 4, a collar 167 of suitable dialectric material insulates the switch arm 164 from each of the mounting studs 166.

The switch arm 164 is adapted to be engaged intermediate its ends by the inner end of an adjusting screw 168 threadably mounted in the bottom wall 162a of the recess 162 of the housing 140. This adjusting screw 168 has a slot at its upper end for engagement by a screw driver to adjust the position of the fixed contact 163 upwardly or downwardly, as viewed in FIG. 4.

Figure 5:
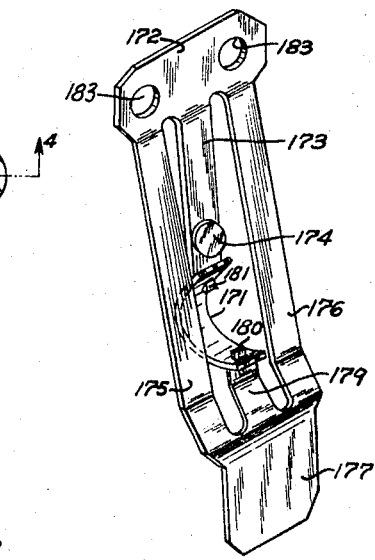
FIG. 5 is an enlarged perspective view of part of the inertia switch mechanism shown in FIG. 4.

The switch 161 further includes a snap-acting, self-biasing, over center mechanism composed of a flexible blade member 170 and a bowed spring 171. The blade member 170, as best shown in FIG. 5, has a cross piece 172 at its upper end and a depending, readily flexible, resilient, metal switch arm 173 carrying a mobile contact 174 near its lower end. The blade 170 also has a pair of flexible and resilient tension arms 175, 176 attached integrally with the top cross piece 173 and extending downwardly therefrom on opposite sides of the mobile switch arm 173. The lower ends of the tension arms 175, 176 are integrally connected by a cross piece or flat tab 177 which extends angularly with respect to the arms 175 and 176.

The lower end 177 of the blade 170, as viewed in FIG. 5, supports an integral upwardly extending arm 179 provided with an upwardly projecting tab 180 at its upper end. The mobile switch arm 173 terminates at its lower end in a similar tab 181 spaced above the tab 180. The bowed spring member 171 has a pair of openings at its opposite ends through which the tabs 180, 181 extend and is engaged under compression between the lower end of the mobile contact arm 173 and the upper end of the upstanding arm 179, and with the bowed spring member 171 maintaining the arm 175 and 176 under tension.

The blade member 170 is adapted to be mounted in the generally horizontal position shown in FIG. 4 to the wall 162a of the housing 140 by the mounting pins 166. To this end, the cross piece 172 has a pair of openings 183 through which the mounting pins 166 are adapted to extend when the blade member is mounted in the position shown in FIG. 4. Each of the openings 183 receive a flanged grommet 184 of suitable dialectric material which insulates the mobile switch arm 173 from the mounting pins 166 and from the fixed switch arm 164.

The mobile switch arm 173 is engaged intermediate its ends by an adjusting screw 190 threadably engaged with a nut 191 fixed to the bottom plate 192 suitably secured to the bottom of the housing 140. The adjusting screw 190 positions the mobile contact 174 and serves as a fulcrum about which the mobile switch arm 173 bends, as will hereinafter become more fully apparent.

The blade member 170 is operatively connected with the ball 141 by a vertically extending pin 200. The pin 200 is slidably received within a through opening 201 in the bottom wall 145 of the socket 142 of the housing 140 and has its upper end in abutting engagement with the bottom of the ball 141, when the latter is on its seat, and its lower end in abutting engagement with the arm 179 of the blade member 170.

Figure 6:
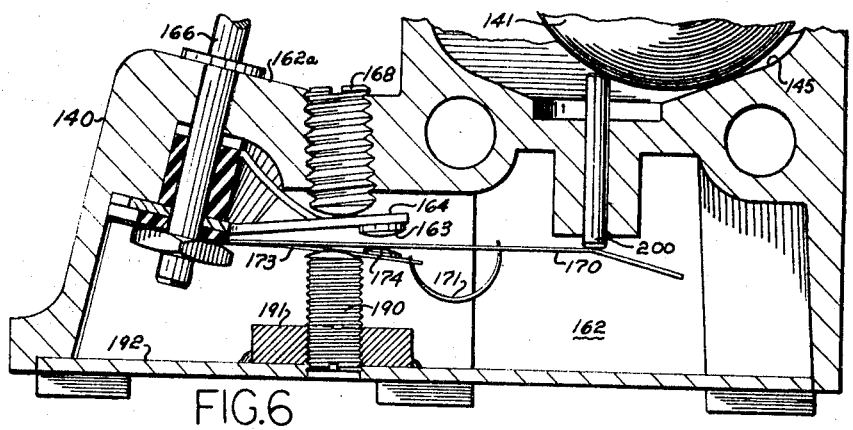
FIG. 6 is a vertical cross-sectional view like that shown in FIG. 4 but showing certain parts thereof in different operative positions.

The snap-acting over center switch 161 functions to relatively move the contacts 163, 174 from their closed position, as shown in FIG. 4, to an open position, as shown in FIG. 6, when the ball 141 moves off its seat in response to inertia forces acting thereon. FIG. 4 shows the position of the parts when the ball 141 is on its seat 147. In this position the weight of the ball 141 urges the pin 200 downwardly against and in opposition to the biasing force of the legs 175, 176 of the blade 170 and with the blade being disposed beneath the plane P of the mobile switch arm 173 carrying the contact 174 so that the bowed spring 171 urges the mobile contact 174 into engagement with the fixed contact 163.

When an inertia force is acting on the ball 141 sufficient to cause the ball 141 to move from its seat 147 up the inclined bottom 145 toward the side wall 144 of the socket 142, the biasing force of the arms 175, 176 of the blade member 170, since they are under tension, will cause the pin member 200 to be moved in an upward direction, this movement of the pin member 200 being now permitted due to the fact that the ball has moved off the seat 147. Movement of the blade member 170 in an upward direction causes the right leg portion of the bowed spring 171 to also be moved in an upward direction. The blade member 170 as it continues to move in an upward direction will move over center and above the plane of the mobile switch arm 173. When this occurs, the bowed compression spring 171 causes the mobile switch arm 173 to be abruptly moved downwardly with a snap-action and with the right end portion of the switch arm 173 bending downwardly around the inner end of the adjusting screw 190 to cause the contacts 163 and 174 to be disengaged, as shown in FIG. 6. The bowed compression spring 171 will now hold the mobile switch contact 174 in this position with a positive spring force until the blade member 170 is again moved downwardly and below the plane of the switch on 173 by the pin member 200 when the ball returns to its seat. When the latter occurs, the switch arm 173 will snap back or upward or upwardly to move the mobile contact 174 into engagement with the fixed contact 163.

The switch contacts 163, 174, in one embodiment of the speed control meachanism, are adapted to control operation of a vacuum release valve means 220 to render the speed governor unit 12 operable or inoperable to control the vehicle speed. The vacuum release valve 220 can be of any suitable or conventional construction, and since it does not per se form a pair of the present invention it will not be described in detail. Suffice it to say that the vacuum release valve means 220 controls communication of the vacuum chamber 34 with the atmosphere via a conduit 221. The vacuum release valve preferably comprises a suitable valve member which is spring biased to an open position to communicate the vacuum chamber 34 to the atmosphere and a solenoid coil 222 operatively associated with the valve member and which, when energized, moves the valve member in opposition to the biasing force of its spring to a closed position in which it blocks communication between the vacuum chamber and the atmosphere via conduit 221.

Figure 7:
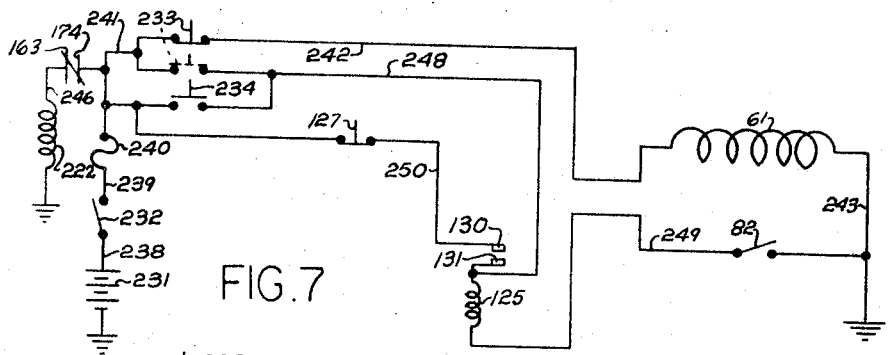
FIG. 7 is a schematic circuit diagram usable with the mechanism shown in FIG. 1.

The operation of the speed control mechanism A will be more readily understood from a description of an electrical control diagram which may be embodied therein and which is schematically illustrated in FIG. 7. The electrical control diagram illustrated in FIG. 7 includes the previously described locking coil 61, the vacuum release coil 125, the minimum speed switch 82, the switch contacts 130, 131 operated by the release coil 121, the vacuum release coil 222, and the switch contacts 163, 174 operated by the inertia switch mechanism 15. This control diagram also includes a battery 231, an ignition switch 232, a spring biased, two position, speed set switch 233, a speed resume switch 234, and the brake pedal switch 127.

The speed set switch 233 and the speed resume switch 234 are suitably mounted for manual operation by the driver of the vehicle, and can be located on the dash board, steering wheel, or turn signal indicated lever of the vehicle.

When the operator of the vehicle turns the ignition switch 232 to its closed position to start the vehicle, a circuit for energizing the locking coil 61 is immediately completed from battery 231, wire 238, now closed ignition switch 232, wire 239, fuse 240, wire 241, speed set switch 233, wire 242, locking coil 61, wire 243 to ground. The completion of this circuit energizes the locking coil 61 to cause the core member 50 to be locked to the flapper valve 42. A circuit for energizing the solenoid coil 222 of the vacuum release valve means 220 is also immediately completed from battery 231, wire 238, now closed ignition switch 232, wire 239, fuse 240, wire 241, normally closed switch contacts 163, 174, wire 246, coil 222 to ground. The completion of this circuit energizes the coil 222 to move the valve member of the release valve means 220 to its closed position to block communication between the vacuum chamber 34 and the atmosphere via conduit 221. However, it should be understood that no speed control, as yet, can take place because the vacuum release coil 125 for closing off communication between the vacuum chamber 34 and the atmosphere has not as yet been energized. Also the minimum speed switch 82 stays open until the vehicle exceeds the predetermined minimum speed (for example, 25 m.p.h.), at which time it closes.

If it is desired to actuate the speed governor unit 12 in order to maintain the vehicle at a predetermined driving speed, the operator must bring the vehicle up to or above the predetermined speed and then, when at that speed, operate the speed set switch 233 to move the same from its solid line position to its dotted line position, as shown in FIG. 7. Movement of the switch 233 to its dotted line position breaks the circuit for the locking coil 61 to deenergize the same and completes a circuit to energize the release coil 125. This circuit is from battery 231, wire 238, now closed ignition switch 232, wire 239, fuse 240, wire 241, switch 233, wire 248, coil 125, wire 249, now closed low speed cutout switch 82, since the speed of the vehicle is above the predetermined low speed, wire 243 to ground. Energization of the coil 125 causes the valve member 124 to be moved in opposition to the biasing force of its spring to a closed position to block communication between the vacuum chamber 34 and the atmosphere. Movement of the valve member 124 to its closed position also causes the switch contacts 130 to 131 to be closed to complete a holding circuit for the coil 125 from battery 231, wire 238, ignition switch 232, wire 239, fuse 240, wire 241, normally closed brake switch 127, wire 250, now closed contacts 130, 131, coil 125, wire 249, now closed switch 82, wire 243 to ground.

When the operator releases the speed set switch 233 it returns to its solid line position, as shown in FIG. 7, to again complete the circuit for energizing the locking coil 61. Such energization of the locking coil 61 caues the core 50 to be locked to the flapper valve 42 so that the speed governor unit 12 now regulates the vehicle speed, and in a manner hereinbefore described. The coil 125 remains energized through the aforedescribed holding circuit when the switch 233 returns to its solid line position.

If the vehicle operator depresses the brake pedal 126, this will open the normally closed brake pedal switch 127 and thus, break the holding circuit for the release coil 125. The breaking of this holding circuit will cause the coil 125 to be deenergized and the release valve to be moved to its open position and thereby communicate the vacuum chamber 34 of the speed governor unit 12 to the atmosphere and render the speed governor unit 12 inoperative to control the vehicle speed.

If the operator releases the brake pedal 126 while the vehicle speed is still in excess of the predetermined minimum speed to effect closing of the switch 82, the operator may reactuate the speed governor unit 12 and reestablish control over the vehicle speed at the desired value by closing the resume switch 234 to complete a circuit for reenergizing the coil 125. This circuit is from battery 231, wire 238, ignition switch 232, wire 239, fuse 240, wire 241, now closed resume switch 234, wire 248, coil 125, wire 249, still closed switch 82, wire 243 to ground. The reenergization of the coil 125 will again block communication between the vacuum chamber 34 and the atmosphere and again close contacts 130, 131 to complete the holding circuit for the coil 125. The speed governor unit will thus be effective to again maintain the speed of the vehicle at the desired value previously set prior to braking, since no deenergization of the locking coil 61 is effected during the braking operation unless the speed of the vehicle is reduced below the predetermined minimum.

When the vehicle is negotiating a curve, or being abruptly linearly decelerated or when the vehicle encounters a series of bumps in the road surface such that the inertia forces acting on the ball 141 of the inertia switch means 15 is moved off its set 147, the speed governor unit is rendered inoperative or ineffective to control the speed of the vehicle. When the ball 141 moves off its seat 147 the contacts 163, 174 of the snap-acting over center switch means 161 are moved to their open position. When this occurs the circuit for energizing the solenoid coil 222 is broken and the solenoid coil deenergized. Deenergization of the coil 222 causes the release valve means 220 to be moved to its open position and thereby communicate the vacuum chambers 34 of the speed governor unit 12 to the atmosphere and render the speed governor unit 12 inoperative or ineffective to control the vehicle speed.

When the vehicle has negotiated the curve or is no longer being linearly decelerated or going over a series of bumps, the ball 141 will return to its seat and cause the snap-acting over center switch means 161 to be moved to their closed position. When the contacts 163, 174 are again closed, the circuit for energizing the coil 222 will again be completed. The reenergization of the coil 222 will again block communication between the vacuum chamber 34 and the atmosphere and the speed governor unit 12 will again be effective to maintain the speed of the vehicle at the desired value at which it was set prior to negotiating the curve, etc.

Figure 8:
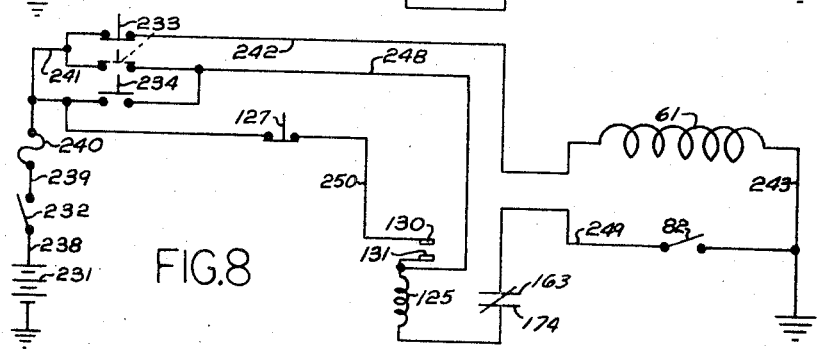
FIG. 8 is a modified schematic circuit diagram usable with the mechanism shown in FIG. 1.

FIG. 8 shows a modified form of electrical control diagram for controlling the speed of the vehicle. The control diagram shown in FIG. 8 is identical to that shown in FIG. 7 except that the control valve means 220 is eliminated and the switch contacts 163, 174 are located in the circuits for the vacuum release coil 125, preferably between the vacuum release coil 121 and the low speed cutout switch 82. Corresponding parts of the control diagram shown in FIG. 8 are given the same reference numerals as appear in FIG. 7.

The control diagram shown in FIG. 8 functions to control the operation of the speed governor unit 12 and thus, the speed of the vehicle, and in the same manner as previously described in connection with the control diagram shown in FIG. 7, except that the contacts 163, 174 when moved to their open position in response to movement of a ball 141 off the seat 147 function to deenergize the release coil 125 and cause the release valve 124 to be moved to its open position and thereby communicate the vacuum chamber 34 of the speed governor unit 12 to the atmosphere to render the speed governor unit ineffective or inoperative to control the vehicle speed.

When the ball 141 returns to the seat 147 the switch contacts 163, 174 are returned to their closed position and the operator may reactuate the speed governor unit 12 and reestablish control over the vehicle speed at the desired value at which it was set prior to negotiating the curve, etc., by closing the resume switch 234 to complete the aforedescribed circuit through the resume switch for reenergizing the coil 125. The reenergization of the coil 125 will again block communication between the vacuum chamber 34 and the atmosphere and again close contacts 130, 131 to complete the holding circuit for the coil 125. The speed governor unit 12 will thus be effective to again maintain the speed of the vehicle at the desired value at which it was set prior to negotiating the curve, etc.

Figure 9:
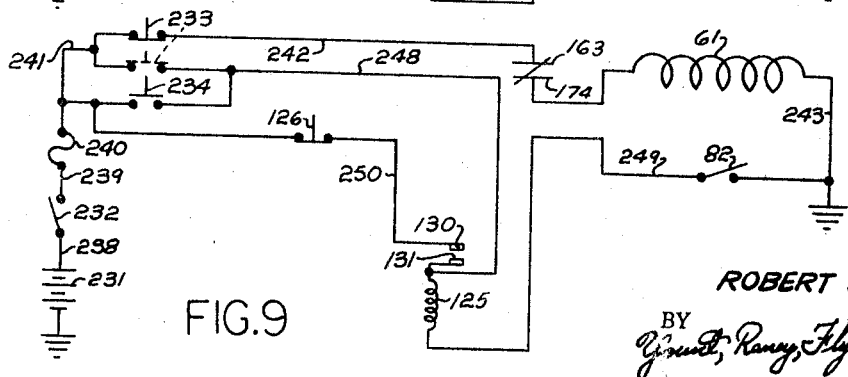
FIG. 9 is another modified circuit diagram usable with the mechanism shown in FIG. 1.

FIG. 9 shows another modified control diagram for controlling the operation of the speed governor unit 12 and thus, the speed of the vehicle. This control diagram is of an identical construction to the control diagram shown in FIG. 7 except that the vacuum release valve means 220 is eliminated and the inertia switch contacts 163, 174 are located in the circuit for energizing the locking coil 61, the contacts 163, 174 being disposed in this circuit between the speed set switch 233 and the locking coil 61. Corresponding parts of the control diagram shown in FIG. 9 are given the same reference numerals as appear in the diagram of FIG. 7.

The control diagram shown in FIG. 9 functions to control the operation of a speed governor unit and thus the speed of the vehicle, and in the same manner as that previously described in connection with the control diagram of FIG. 7, except that the inertia switch means 15 functions to deenergize the locking coil 61 when an inertia force is acting on the ball 141 sufficient to cause it to be moved off its seat 147. When the contacts 163, 174 are relatively moved to their open positions, the circuit for energizing the locking coil 61 is broken and the locking coil 61 is deenergized. When the locking coil 61 is deenergized the flapper valve 42 is no longer locked to the core member 50 and the spring 45 returns the flapper valve toward its position against the vacuum nozzle 43. This increases the atmospheric vent through the nozzle 44 and renders the speed governor unit ineffective to control the vehicle speed.

When the ball 141 returns to its seat, the contacts 163, 174 are again closed and the circuit for the locking coil 61 is again completed and the locking coil 61 reenergized. Reenergization of the locking coil 61 causes the flapper valve 42 to be locked to the core member 50 such that the speed governor unit 12 is effective to maintain the speed of the vehicle at the reduced value attained after negotiating the curve, etc.

It is also within the purview of the present invention to employ the switch arm 173 and the adjusting screw 190 as switch contacts to initiate a separate circuit (not shown) for collateral purposes such as, for tightening safety belts, lighting a panel light to indicate a certain condition or for controlling other devices on the vehicle. Although the preferred embodiment of the inertia switch mechanism 15, a ball which is movable in response to inertia forces acting thereon, it will, of course, be understood that other inertia sensing members or means, such as a mercury puddle, could be employed for opening and closing a pair of switch contacts.

From the foregoing, it should be apparent that the heretofore enumerated objects and others have been accomplished, and that a novel mechanism for controlling the speed of an automotive vehicle has been provided.

Having described my invention, I claim:

1. A mechanism for effecting movement of a vehicle throttle member to control vehicle speed and which comprises an actuating member movable in one direction to effect movement of the throttle member in a throttle opening direction, vacuum chamber means on one side of said actuating member, said actuating member being movable in said one direction upon creation of a vacuum of a predetermined degree in said vacuum chamber, a valve member movable to control the degree of vacuum in said vacuum chamber, centrifugal force responsive means operable when a predetermined centrifugal force is acting thereon when the vehicle is negotiating a curve, means responsive to operation of said centrifugal force responsive means for substantially reducing the degree of vacuum in said vacuum chamber means to reduce the speed of the vehicle while negotiating the curve, a control means for releasing the vacuum in said vacuum chamber means, wherein said means responsive to said centrifugal force responsive means includes a switch means actuatable in response to operation of the centrifugal force responsive means for controlling operation of said control means to release the vacuum in said vacuum chamber means, said vacuum chamber means having a vacuum connection and an atmospheric vent connection spaced from said vacuum connection and located opposite to said vacuum connection, said valve member being movable between said vacuum connection and said atmospheric vent connection to control the degree of vacuum in the vacuum chamber, means for biasing said valve member toward said vacuum connection, and means including selectively energizable means for moving the valve member between said vacuum and atmospheric connections in accordance with the speed of the vehicle, said switch means being located in an electric circuit with said selectively energizable means and when actuated deenergizes said energizable means to allow said biasing means to move said valve member toward said vacuum connection to increase the atmospheric vent to the vacuum chamber means and reduce the degree of vacuum in said vacuum chamber.

2. A mechanism, as defined in claim 1, and wherein said centrifugal force responsive means is also operable when a predetermined inertia force is acting thereon when the vehicle is linearly decelerating.

3. A mechanism, as defined in claim 1, and wherein said centrifugal force responsive means is also operable when predetermined inertia forces are acting thereon due to the vehicle encountering and going over a series of bumps in the road surface.

4. A mechanism for effecting movement of an engine throttle member to maintain the speed of a vehicle substantially at a desired speed, said mechanism comprising vacuum chamber means associated with the throttle member and capable of being expanded to one condition in response to an increase in fluid pressure in said vacuum chamber means to thereby effect movement of the throttle member in one direction and contracted to another condition in response to a decrease in fluid pressure in said vacuum chamber means to thereby effect movement of the throttle member in another direction, first conduit means for connecting said vacuum chamber means in fluid communication with a first source of fluid, second conduit means for connecting said vacuum chamber means in fluid communication with a second source of fluid which is at a relatively low pressure compared to said first source of fluid, first valve means for regulating the flow of fluid through said first and second conduit means, first control means for operating said first valve means in response to a change in vehicle speed from the desired speed to vary the pressure in said vacuum chamber means and thereby change the condition of said vacuum chamber means to move the throttle member and return the vehicle speed to the desired speed, third conduit means for connecting said vacuum chamber means in fluid communication with said first source of fluid, second valve means for regulating a flow of fluid through said third conduit means, and second control means for operating said second valve means, said second control means including selectively operable electromagnetic means for actuating said second valve means independently of said first valve means to enable fluid to flow from said first source of fluid to said vacuum chamber means, switch means electrically connected with said electromagnetic means for effecting operation thereof, and sensor means operable in response to a predetermined centrifugal force acting thereon to actuate said switch means when the vehicle is negotiating a curve to thereby effect operation of said electromagnetic means and said second valve means to substantially reduce the degree of vacuum in said vacuum chamber means to effect a reduction in the speed of the vehicle while the vehicle is negotiating a curve.

5. A mechanism as set forth in claim 4 further including second switch means electrically connected to said electromagnetic means and actuatable in response to braking of the vehicle for effecting operation of both said electromagnetic means and said second valve means to substantially reduce the degree of vacuum in said vacuum chamber means.

6. A mechanism as set forth in claim 4 wherein said sensor means is also responsive to a predetermined rate of linear forward deceleration of the vehicle to operate said switch means to effect operation of said electromagnetic means and said second valve means to substantially reduce the degree of vacuum in said vacuum chamber means.

7. A mechanism as set forth in claim 6 wherein said sensor means is also responsive to the encountering of a series of bumps by the vehicle to operate said switch means.

8. A mechanism as set forth in claim 4 wherein said sensor means includes a housing having an opening therein defined by side and bottom wall surfaces and a spherical ball rollable on said bottom wall surface from a first position to a second position, said ball in said first position being operative to effect actuation of said switch means to a first condition in which said electromagnetic means operates said second valve means to a closed condition, said switch means being operable to a second condition to actuate said switch means to operate said valve means to an open condition in response to the negotiating of a curve by the vehicle when said ball is in said second position to thereby effect the reduction in the degree of vacuum in said vacuum chamber means.

9. A mechanism as set forth in claim 8 wherein said switch means includes a snap-acting over center spring means carried by said housing and a pair of contacts, said snap-acting over center spring means having a portion movable to effect actuation of said contacts from said first condition to said second condition, said ball being rollable from said second position to said first position to effect actuation of said snap-acting over center spring means from said second condition to said first condition.

10. A mechanism as defined in claim 9 further including a vertically extending pin slidably supported by said housing and having one end in abutting engagement with said portion of said snap-acting over center spring and the other end in abutting engagement with said housing.

11. A mechanism for effecting movement of a vehicle throttle member to maintain the speed of a vehicle substantially at a desired speed, said mechanism comprising an actuating member movable in one direction to effect movement of the throttle member in a throttle opening direction, vacuum chamber means on one side of said actuating member, said actuating member being movable in said one direction upon creation of a vacuum of a predetermined degree in said vacuum chamber, a valve member movable to control the degree of vacuum in said vacuum chamber, centrifugal force responsive means operable when a predetermined centrifugal force is acting thereon when the vehicle is negotiating a curve, electrically operated control means for releasing the vacuum in said vacuum chamber means, means responsive to operation of said centrifugal force responsive means for substantially reducing the degree of vacuum in said vacuum chamber means to reduce the speed of the vehicle while negotiating the curve including a switch means located in a circuit with said electrically operated control means and having a pair of contacts relatively movable between open and closed positions, said contacts being actuatable in response to operation of the centrifugal force responsive means for controlling the energization and deenergization of said electrically operated control means to release the vacuum in said vacuum chamber means.

12. A mechanism, as defined in claim 11, and wherein said circuit includes a second switch means which is actuatable upon braking of the vehicle for controlling operation of said electrically operated control means for releasing the vacuum in said vacuum chamber means.

References Cited

UNITED STATES PATENTS

| | | | |
|---|---|---|---|
| 1,241,888 | 10/1917 | Safford | 200—61.52 |
| 2,016,864 | 10/1935 | Lange | 123—97 X |
| 2,428,029 | 9/1947 | Katcher | 180—107 |
| 2,726,728 | 12/1955 | Ayle | 180—109 |
| 3,023,828 | 3/1962 | Fuller et al. | 180—109 |
| 3,066,202 | 11/1962 | Kaleba et al. | 200—61.5 |
| 3,110,780 | 11/1963 | Schultz et al. | 200—61.5 |
| 3,207,252 | 9/1965 | Cripe et al. | 180—108 |
| 3,343,423 | 9/1967 | Thorner | 180—108 X |

KENNETH H. BETTS, *Primary Examiner.*

U.S. Cl. X.R.

123—102; 200—61.52, 73